(12) United States Patent
Lukacs et al.

(10) Patent No.: US 9,563,457 B2
(45) Date of Patent: Feb. 7, 2017

(54) ENABLING A SECURE ENVIRONMENT THROUGH OPERATING SYSTEM SWITCHING

(71) Applicant: Bitdefender IPR Management Ltd., Nicosia (CY)

(72) Inventors: Sandor Lukacs, Floresti (RO); Radu I. Ciocas, Cluj-Napoca (RO); Vlad I. Topan, Cluj-Napoca (RO); Adrian V. Colesa, Cluj-Napoca (RO); Raul V. Tosa, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 247 days.

(21) Appl. No.: 14/082,478

(22) Filed: Nov. 18, 2013

(65) Prior Publication Data

US 2015/0143362 A1    May 21, 2015

(51) Int. Cl.
*G06F 9/455* (2006.01)
*G06F 9/48* (2006.01)

(52) U.S. Cl.
CPC ......... *G06F 9/45558* (2013.01); *G06F 9/4843* (2013.01); *G06F 2009/45587* (2013.01)

(58) Field of Classification Search
CPC  G06F 9/45533; G06F 9/4843; G06F 9/45558; G06F 2009/45587
See application file for complete search history.

(56) References Cited

U.S. PATENT DOCUMENTS

| 4,747,040 | A | 5/1988 | Blanset et al. |
| 6,263,392 | B1 * | 7/2001 | McCauley ............ G06F 9/4411 463/25 |
| 6,393,560 | B1 | 5/2002 | Merrill et al. |
| 7,409,536 | B2 | 8/2008 | Guo et al. |
| 7,631,196 | B2 | 12/2009 | Kozuch et al. |
| 7,779,243 | B2 | 8/2010 | Adrangi et al. |

(Continued)

OTHER PUBLICATIONS

François Armand et al., "A Practical Look at Micro-Kernels and Virtual Machine Monitors", [Online], 2008, pp. 1-7, [Retrived from Internet on Dec. 10, 2016], <http://citeseerx.ist.psu.edu/viewdoc/download?doi=10.1.1.470.1106&rep=rep1&type=pdf>.*

(Continued)

*Primary Examiner* — Thuy Dao
*Assistant Examiner* — Ziaul A Chowdhury
(74) *Attorney, Agent, or Firm* — Law Office of Andrei D Popovici, PC

(57) ABSTRACT

Described systems and methods allow a host system, such as a computer or a smartphone, to enable a secure environment, which can be used to carry out secure communications with a remote service provider, for applications such as online banking, e-commerce, private messaging, and online gaming, among others. A hypervisor oversees a switch between an insecure environment and the secure environment, in response to a user input, or in response to an event such as receiving a telephone call. Switching from the insecure to the secure environment comprises transitioning the insecure environment to a sleeping state and loading the secure environment from a memory image (snapshot) saved to disk, after checking the integrity of the snapshot. Switching from the secure to the insecure environment comprises transitioning the secure environment into a sleeping state and waking up the insecure environment.

27 Claims, 6 Drawing Sheets

(56) References Cited

U.S. PATENT DOCUMENTS

| | | | |
|---|---|---|---|
| 7,945,786 B2 | 5/2011 | Kumar et al. | |
| 8,010,993 B1* | 8/2011 | Bartholomay | H04L 63/10 |
| | | | 726/1 |
| 8,312,476 B2 | 11/2012 | Chin et al. | |
| 8,380,973 B2 | 2/2013 | Cool et al. | |
| 8,407,476 B2 | 3/2013 | Kozuch et al. | |
| 8,407,717 B2 | 3/2013 | Ho | |
| 8,413,146 B1* | 4/2013 | McCorkendale | G06F 9/45558 |
| | | | 711/6 |
| 8,433,889 B2 | 4/2013 | Princen et al. | |
| 8,478,978 B2 | 7/2013 | Lin | |
| 8,510,859 B2 | 8/2013 | Zimmer et al. | |
| 8,977,842 B1* | 3/2015 | McCorkendale | G06F 21/53 |
| | | | 380/285 |
| 9,081,602 B1* | 7/2015 | Omelyanchuk | G06F 11/3644 |
| 9,081,989 B2* | 7/2015 | Lie | G06F 9/45558 |
| 9,342,373 B2* | 5/2016 | Hansson | G06F 9/5077 |
| 2001/0018717 A1 | 8/2001 | Shimotono | |
| 2008/0092145 A1 | 4/2008 | Sun et al. | |
| 2008/0133903 A1 | 6/2008 | Sun et al. | |
| 2008/0288748 A1 | 11/2008 | Sutardja et al. | |
| 2010/0305936 A1* | 12/2010 | May | G06F 9/4843 |
| | | | 703/23 |
| 2010/0306774 A1* | 12/2010 | Kalbarga | G06F 9/441 |
| | | | 718/1 |
| 2011/0154328 A1* | 6/2011 | Mo | G06F 9/45541 |
| | | | 718/1 |
| 2011/0246698 A1 | 10/2011 | Warrier et al. | |
| 2012/0102314 A1 | 4/2012 | Zheng et al. | |
| 2012/0180042 A1* | 7/2012 | Tsirkin | G06F 9/45558 |
| | | | 718/1 |
| 2012/0240112 A1* | 9/2012 | Nishiguchi | G06F 9/45558 |
| | | | 718/1 |
| 2012/0246641 A1 | 9/2012 | Gehrmann | |
| 2012/0297177 A1 | 11/2012 | Ghosh et al. | |
| 2012/0303971 A1 | 11/2012 | Palka et al. | |
| 2013/0054952 A1 | 2/2013 | Shen | |
| 2013/0061293 A1 | 3/2013 | Mao | |
| 2013/0097603 A1* | 4/2013 | Amano | G06F 9/4843 |
| | | | 718/1 |
| 2013/0232238 A1 | 9/2013 | Cohn et al. | |

OTHER PUBLICATIONS

George W. Dunlap et al., "ReVirt: Enabling Intrusion Analysis through Virtual-Machine Logging and Replay", [Online], 2002, pp. 211-224, [Retrieved from Internet on Dec. 10, 2016], <http://delivery.acm.org/10.1145/850000/844148/p211-dunlap.pdf>.*

Arvind Seshadri et al., "SecVisor: A Tiny Hypervisor to Provide Lifetime Kernel Code Integrity for Commodity OSes", [Online], 2007, pp. 335-350, [Retrieved from Interenet on Dec. 10, 2016], <http://delivery.acm.org/10.1145/1300000/1294294/p335-seshadri.pdf>.*

Jakub Szefer et al., "Eliminating the Hypervisor Attack Surface for a More Secure Cloud", [Online], 2011, pp. 401-412, [Retrieved from Internet on Dec. 10, 2016], <http://delivery.acm.org/10.1145/2050000/2046754/p401-szefer.pdf>.*

J. Sun et al., "Supporting Multiple OSes with OS Switching," 2007 Usenix Annual Technical Conference, Santa Clara, CA, Jun. 17-22, 2007.

Gordon, "How to Dual Boot Multiple ROMs on Your Android Phone," www.lifehacker.com, Jul. 29, 2011.

K. Sun et al., "SecureSwitch: BIOS-Assisted Isolation and Switch between Trusted and Untrusted Commodity OSes," 19th Annual Network & Distributed System Security Symposium, San Diego, CA, Feb. 5-8, 2012.

Kendrick, "ASUS bridges Android and Windows 8 with new Transformer Book Trio," www.zdnet.com, Sep. 12, 2013.

SK Saini, "Samsung Ativ Q dual boot convertible tablet PC is now available to pre-order: specification, features and price," www.technovisitors.com, archive.org indicates that the article was available online on Oct. 21, 2013.

Vasudevan et al., "Lockdown: Towards a Safe and Practical Architecture for Security Applications on Commodity Platforms," Trust'12 Proceedings of the 5th international conference on Trust and Trustworthy Computing, pp. 34-54, Vienna, Austria, Jun. 13-15, 2012.

* cited by examiner

ENABLING A SECURE ENVIRONMENT THROUGH OPERATING SYSTEM SWITCHING

BACKGROUND

The invention relates to systems and methods for securing electronic communication between a client and a remote service provider, and in particular systems and methods using hardware virtualization technology.

An increasing number of goods and services are currently provided online, through electronic communication networks such as the Internet. In some such applications, users may remotely access a protected resource such as a bank account through an e-banking platform hosted on a server computer system. To access the protected resource, users are typically required to provide some credentials, such as a password and/or an access code. In e-commerce applications, users may transmit sensitive information such as credit card details and/or other personal information to a remote computer system. Such sensitive data is typically input by the user into an electronic device such as a computer, mobile phone, etc. Subsequently, the sensitive information circulates over a communication network between the user's electronic device and the remote computer system.

Malicious software, also known as malware, affects a great number of computer systems worldwide. In its many forms such as computer viruses, worms, and rootkits, malware presents a serious risk to millions of computer users, making them vulnerable to loss of data and sensitive information, identity theft, and loss of productivity, among others. Malware may attempt to steal private or sensitive information, e.g., by intercepting keyboard inputs corresponding to a user's password or credit card number, or by intercepting communication between the malware-infected computer system and a remote computer system.

Hardware virtualization technology allows the creation of simulated computer environments commonly known as virtual machines (VM), which behave in many ways as physical computer systems. Several virtual machines may run simultaneously on the same hardware platform (physical machine), sharing the hardware resources among them, thus allowing potentially a great number of users to share a computer system. A virtual machine may run its own operating system and/or software applications separately from other virtual machines, thus increasing data security and privacy.

There is considerable interest in developing electronic communication devices allowing users to securely exchange data with remote computer systems, especially when such devices operate on hardware virtualization platforms.

SUMMARY

According to one aspect, a host system comprises at least one processor configured to execute a hypervisor, the hypervisor configured to expose a client virtual machine (VM) and a secure VM, the client VM and secure VM executing alternately on the host system. The client VM is configured to execute a VM switch application, the VM switch application configured, in response to detecting a trigger event indicative of a risk to a user's data security, to instruct an operating system of the client VM to perform a wake-to-sleep transition, the wake-to-sleep transition configured to transform the client VM from a state in which a peripheral device used by the client VM is in a high-powered condition to a state in which the peripheral device is in a low-powered condition. The hypervisor is further configured to switch execution to the secure VM, wherein switching execution to the secure VM comprises loading a pre-determined core VM snapshot into memory, the core VM snapshot being determined by initializing an operating system of the secure VM while hiding the peripheral device from the operating system of the secure VM. Switching execution to the secure VM further comprises, in response to intercepting an event indicative of the wake-to-sleep transition, executing the core VM snapshot to launch the secure VM, and in response to launching the secure VM, revealing the peripheral device to the operating system of the secure VM.

According to another aspect, a non-transitory computer-readable medium stores instructions which, when executed, configure at least one processor of a host system to form a hypervisor, the hypervisor configured to expose a client virtual machine (VM) and a secure VM, the client VM and secure VM executing alternately on the host system. The client VM is configured to execute a VM switch application, the VM switch application configured, in response to detecting a trigger event indicative of a risk to a user's data security, to instruct an operating system of the client VM to perform a wake-to-sleep transition, the wake-to-sleep transition configured to transform the client VM from a state in which a peripheral device used by the client VM is in a high-powered condition to a state in which the peripheral device is in a low-powered condition. The hypervisor is further configured to switch execution to the secure VM, wherein switching execution to the secure VM comprises loading a pre-determined core VM snapshot into memory, the core VM snapshot being determined by initializing an operating system of the secure VM while hiding the peripheral device from the operating system of the secure VM. Switching execution to the secure VM further comprises, in response to intercepting an event indicative of the wake-to-sleep transition, executing the core VM snapshot to launch the secure VM, and in response to launching the secure VM, revealing the peripheral device to the operating system of the secure VM.

According to another aspect, a non-transitory computer-readable medium stores instructions which, when executed, configure at least one processor of a host system to form a hypervisor, the hypervisor configured to expose a client virtual machine (VM) and a secure VM, the client VM and secure VM executing alternately on the host system. The client VM is configured to execute a VM switch application, the VM switch application configured, in response to detecting a trigger event indicative of a risk to a user's data security, to instruct an operating system of the client VM to perform a wake-to-sleep transition, the wake-to-sleep transition configured to transform the client VM from a state in which a peripheral device used by the client VM is in a high-powered condition to a state in which the peripheral device is in a low-powered condition. The hypervisor is further configured to switch execution to the secure VM, wherein switching execution to the secure VM comprises loading a pre-determined core VM snapshot into memory, the core VM snapshot being determined by initializing an instance of the operating system of the secure VM on a second computer system distinct from the host system, while the peripheral device is not present. Switching execution to the secure VM further comprises, in response to intercepting an event indicative of the wake-to-sleep transition, executing the core VM snapshot to launch the secure VM, and in response to launching the secure VM, revealing the peripheral device to the operating system of the secure VM.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a hash is an output of a hash function. Unless otherwise specified, a hash function is a mathematical transformation mapping a variable-length sequence of symbols (e.g. characters, bits) to fixed-length data such as a number or bit string. Unless otherwise specified, a page represents the smallest unit of virtualized memory individually mapped to a physical memory of a host computer system. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
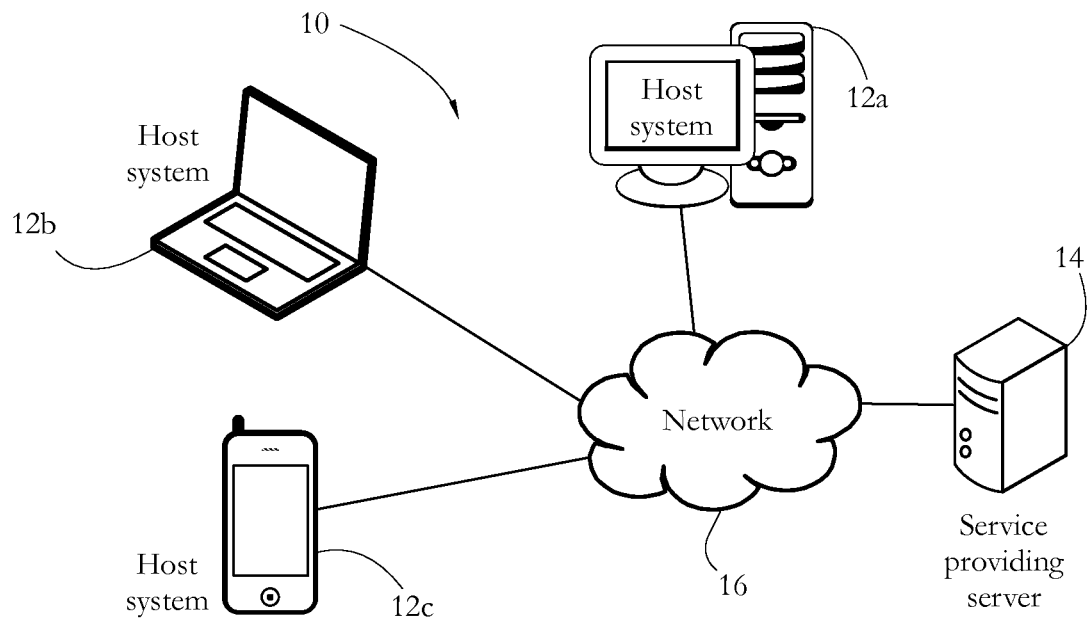
FIG. 1 shows an exemplary electronic communication system wherein a plurality of host systems are connected to a remote service providing server via a communication network.

FIG. 1 shows an exemplary secure communication system 10 according to some embodiments of the present invention. System 10 comprises a service providing server 14 and a set of host systems 12a-c, all connected via a communication network 16. In some embodiments, server 14 may provide services such as online banking, e-commerce, teleconferencing, and gaming, among others. For instance, an illustrative service providing server 14 may host a webpage allowing users of host systems 12a-c to remotely access bank accounts via a web interface. Another example of server 14 hosts an online store offering goods and/or services to users of host systems 12a-c. Other illustrative service providing servers may host computer entertainment (gaming) and/or social media sites. Network 16 carrying data between server 14 and host systems 12a-c may be a wide area network such as the Internet, and may comprise a local area network (LAN) and/or a mobile telecommunication network.

Host systems 12a-c may represent corporate computing devices such as an enterprise server, or end-user devices such as a personal computer, tablet computer, or smartphone, among others. Other host systems include entertainment devices such as TVs and game consoles, wearable computing devices, or any other electronic device having a memory and a processor. In some embodiments, each host system 12a-c may be used by a single user (e.g., an employee of a company), or several users may access the same client system 12a-c (e.g. in work shifts, sales points operated by multiple employees, etc.).

Figure 2:
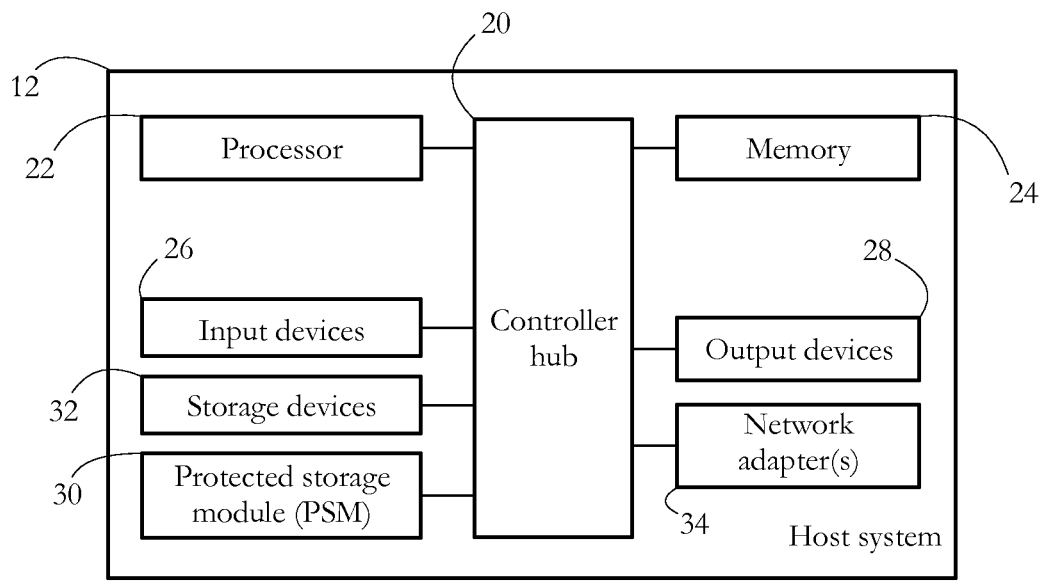
FIG. 2 illustrates an exemplary hardware configuration of a host system, according to some embodiments of the present invention.

FIG. 2 shows an exemplary hardware configuration of a host system 12, such as host systems 12a-c of FIG. 1, according to some embodiments of the present invention. System 12 represents a computer system for illustrative purposes; other devices such as smartphones may have a different configuration. In some embodiments, host system 12 comprises a processor 22, a memory unit 24, a set of input devices 26, a set of output devices 28, a set of storage devices 32, and a set of network adapter(s) 34, all interconnected by a controller hub 20.

In some embodiments, processor 22 comprises a physical device (e.g. multi-core integrated circuit) configured to execute computational and/or logical operations with a set of signals and/or data. In some embodiments, such logical operations are delivered to processor 22 in the form of a sequence of processor instructions (e.g. machine code or other type of software). Memory unit 24 may comprise volatile computer-readable media (e.g. RAM) storing data/signals accessed or generated by processor 22 in the course of carrying out instructions. Input devices 26 may include computer keyboards, mice, and microphones, among others, including the respective hardware interfaces and/or adapters allowing a user to introduce data and/or instructions into host system 12. Output devices 28 may include display devices such as monitors and speakers among others, as well as hardware interfaces/adapters such as graphic cards, allowing system 12 to communicate data to a user. In some embodiments, input devices 26 and output devices 28 may share a common piece of hardware, as in the case of touch-screen devices. Storage devices 32 include computer-readable media enabling the non-volatile storage, reading, and writing of software instructions and/or data. Exemplary storage devices 32 include magnetic and optical disks and flash memory devices, as well as removable media such as CD and/or DVD disks and drives. Network adapter(s) 34 enable host system 12 to connect to network 16 and/or to other devices/computer systems.

Figure 3:
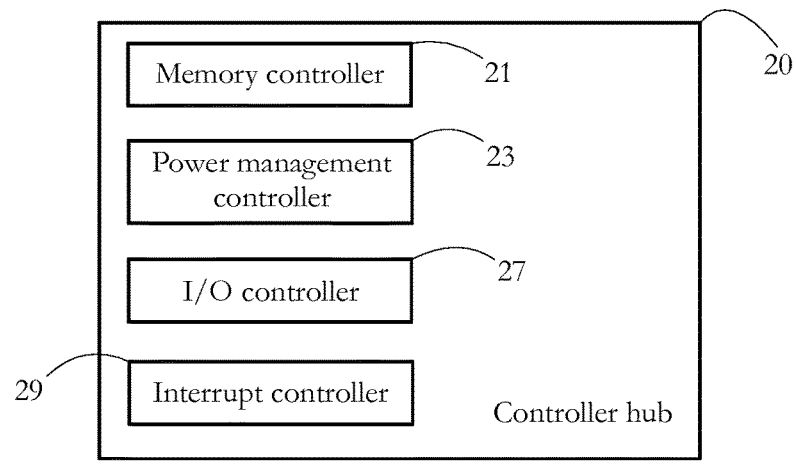
FIG. 3 shows exemplary components of a controller hub of the host system according to some embodiments of the present invention.

Controller hub 20 represents the plurality of system, peripheral, and/or chipset buses, and/or all other circuitry enabling the communication between processor 22 and devices 24, 26, 28, 30, 32, and 34. FIG. 3 shows exemplary components of controller hub 20, such as a memory controller 21, a power management controller 23, an input/output (I/O) controller 27, and an interrupt controller 29. Depending on hardware manufacturer, some or all of devices 21, 23, 27 and 29 may be incorporated into a single integrated circuit, and/or may be integrated with processor 22. In some embodiments, some other devices, such as graphics adapters forming part of output devices 28, may be also integrated with processor 22.

Memory controller 21 may oversee communication between processor 22 and memory unit 24. In some embodiments, for instance using Intel® chipsets, memory controller 21 may comprise the northbridge. In other embodiments, for instance in mobile telephone hardware platform designed according to the ARM® specification, memory controller 21 may comprise a memory management unit (MMU), among others. I/O controller 27 generically represents the circuitry and signal logic components enabling the data flow between processor 22 and a plurality of peripheral devices, including for instance input, output, storage, and network devices, among others. In some embodiments, such as a typical computer chipset, I/O controller 27 includes the southbridge, peripheral component interconnect (PCI) bus and/or low pin-count (LPC) bus of a typical computer chipset. Interrupt controller 29 generically represents circuitry and logic configurable to manage interrupt signals transmitted between processor 22 and devices 24, 26, 28, 30, 32, and 34, among others. Power management controller 23 generically represents circuitry and signal logic configurable to manage power consumption of host system 12, as directed by an operating system executing on system 12. In some embodiments, controller 23 is configurable according to the Advanced Power Management (APM) and/or Advanced Configuration and Power Interface (ACPI) standards.

Host system 12 may also include a protected storage module 30. In some embodiments, module 30 is a hardware device, e.g. an integrated circuit, configured to securely store sensitive information. Protected storage module 30 may comprise a persistent memory configured so that software executing on the respective host system 12 may not overwrite a content of persistent memory. In one typical application of such persistent memory, module 30 may be configured to store a cryptographic key uniquely associated with the respective module and/or host system 12 in the persistent memory (an exemplary such key is known as an endorsement key in some embodiments). Storage module 30 may further comprise a writable memory, configured so that selected software objects executing on the respective machine are allowed to overwrite data stored in the writable memory. For instance, module 30 may be configured so that only software components of a hypervisor and/or other software executing at root level of processor privilege may have write permission to the writable memory (see more details below). In some embodiments, protected storage module 30 also comprises a cryptographic processor configured to generate cryptographic keys, to compute hashes, and/or to perform encryption/decryption of data. Exemplary protected storage modules 30 include trusted platform module (TPM) chips produced by various hardware manufacturers.

Figure 4:
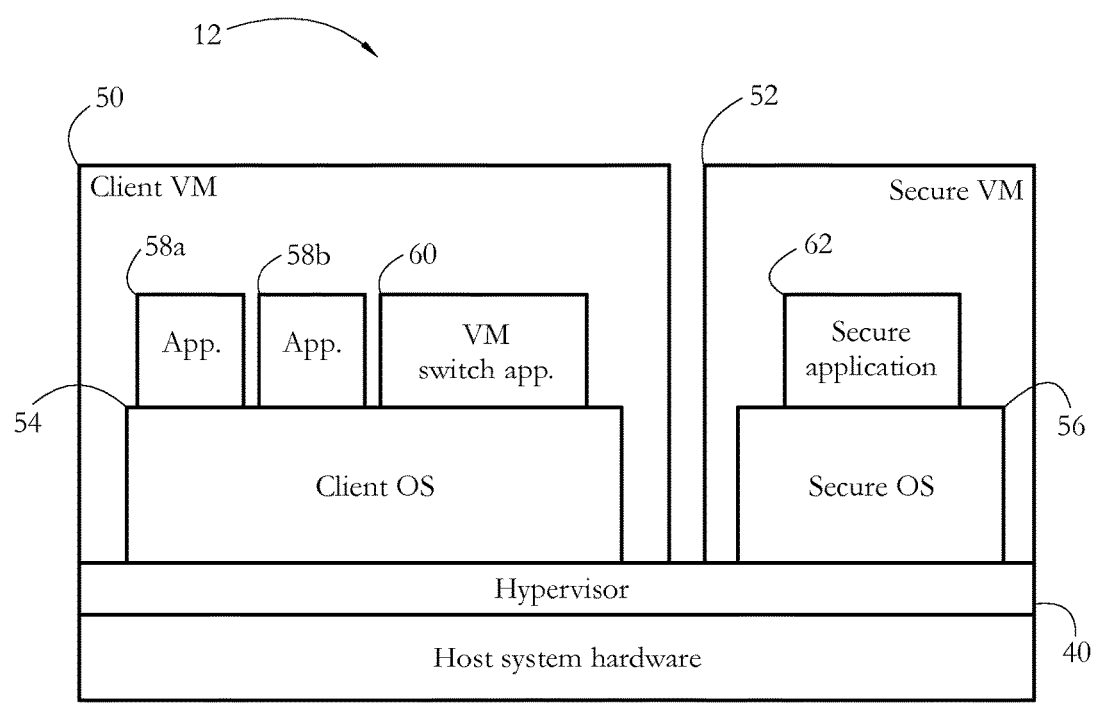
FIG. 4 shows an exemplary configuration of virtual machines (VM) executing on a host system according to some embodiments of the present invention.

FIG. 4 shows an exemplary configuration of virtual machines (VM) executing on host system 12 according to some embodiment of the present invention. Virtual machines are commonly known in the art as software emulations of actual physical machines/computer systems, each capable of running its own operating system and software independently of other VMs. In some embodiments, a hypervisor 40, also known in the art as a virtual machine monitor (VMM), executes on the host system hardware, enabling multiple virtual machines and/or operating systems (OS) to run concurrently on host system 12, with various degrees of isolation. Examples of popular hypervisors include the VMware ESXi™ from VMware Inc. and the open-source Xen hypervisor, among others. To enable such a virtual machine, an operation also termed exposing the respective virtual machine, software components of hypervisor 40 may create a plurality of virtual devices, each virtual device emulating the operation and functionality of a physical hardware device of host system 12. Hypervisor 40 may further assign a set of virtual devices to each VM executing on system 12, allowing the respective VM to operate as if it possessed a more-or-less complete set of hardware devices. In some embodiments, hypervisor 40 operates in a configuration known in the arte as a thin-layer hypervisor, wherein hypervisor 40 only virtualizes a minimal set of hardware devices, such as processor 22, memory 24, and parts of controller hub 20, while giving virtual machines direct access to some peripheral devices, which are not virtualized.

In some embodiments of the present invention, hypervisor 40 is configured to expose a client VM 50 and a secure VM 52, and to alternate execution between VM 50 and VM 52. For instance, secure VM 52 is allowed to execute only while client VM 50 is in a sleeping state, and client VM 50 is allowed to execute only while secure VM 52 is in a sleeping state, as shown in detail below. Although FIG. 4 shows only two VMs for simplicity, in some embodiments hypervisor 40 may be configured to expose more than two VMs. In one such example, hypervisor 40 may expose one client VM 50 and a plurality of secure VMs 52, for instance one secure VM for each of a plurality of uses, such as e-banking, gaming, etc. Hypervisor 40 may further alternate execution so that no secure VM may execute while the client VM is in a working state (e.g., ACPI state S0).

Client VM 50 may execute a client OS 54 and/or a set of software applications 58*a*-*b*. Client OS 54 comprises software that provides an interface to the (virtualized) hardware of client VM 50, and acts as a host for computing applications 58*a*-*b* running on the respective OS. Client OS 54 may comprise any widely available operating system such as Windows®, MacOS®, Linux®, iOS®, or Android™, among others. Applications 58*a*-*b* may include word processing, image processing, media player, database, calendar, personal contact management, browser, gaming, voice communication, and data communication applications, among others.

In some embodiments, a virtual machine switch application 60 may execute within client VM 50 concurrently with applications 58*a-b*. VM switch application 60 may be configured to interface with hypervisor 40, so as to switch execution from client VM 50 to secure VM 52 at the request of a user of client VM 50. In a typical example, the user of client VM 50 intends to carry out a secure data exchange with service providing server 14, for instance to securely perform an online banking transaction. The user may indicate his/her intent to application 60 by pressing a pre-defined combination of keyboard keys, or by clicking a button of a graphical user interface (GUI). In response, VM switch application 60 may signal client OS 54 to enter sleep mode, and further signal hypervisor 40 to enable secure VM 52. Application 60 may be a standalone program, or may be part of a software suite including, among others, anti-malware, anti-spam, and privacy protection applications. The operation of application 60 is described in detail below.

In some embodiments, secure VM 52 comprises a secure OS 56 and a secure application 62 executing on OS 56. Secure OS 56 may comprise a modified version of a widely available operating system such as Linux® or Android™, among others. An exemplary secure application 62 comprises a web browser allowing a user to securely exchange data with service providing server 14. Other examples of secure application 62 include gaming and social media applications, among others. In some embodiments, secure VM 52 is launched by hypervisor 40 from an authenticated snapshot stored on a computer-readable medium of host system 12, as shown in more detail below. In other embodiments, secure VM 52 and/or hypervisor 40 are loaded from a secure location accessible via network 16.

Figure 5:
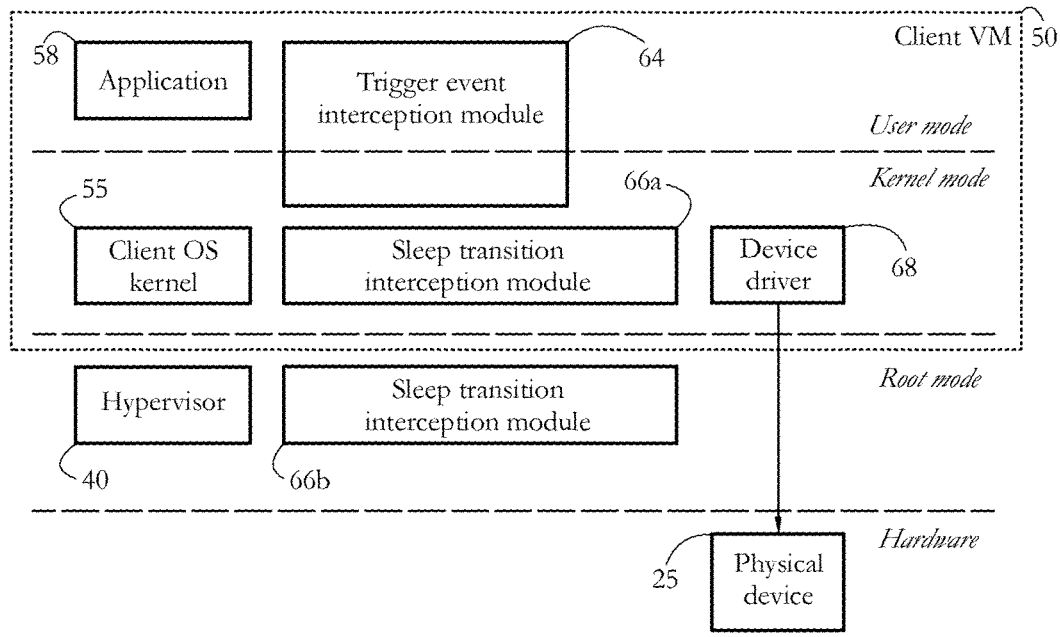
FIG. 5 shows an exemplary set of software objects executing on the host system according to some embodiments of the present invention.

FIG. 5 shows exemplary software objects executing on host system 12 according to some embodiments of the present invention. FIG. 5 is shown from the perspective of processor privilege levels, also known in the art as layers or protection rings. In some embodiments, each such layer or protection ring is characterized by a set of instructions, which a software object executing at the respective processor privilege level is allowed to execute. When a software object attempts to execute an instruction, which is not allowed within the respective privilege level, the attempt may trigger a processor event, such as an exception, a fault, or a virtual machine exit event. In some embodiments, switching between privilege levels may be achieved via a set of dedicated instructions. Such exemplary instructions on Intel® platforms include SYSCALL/SYSENTER, which switch from user mode to kernel mode, SYSRET/SYSEXIT, which switch from kernel mode to user mode, VMCALL, which switches from either user or kernel mode to root mode, and VMRESUME, which switches from root mode to either kernel or user mode.

In some embodiments, hypervisor 40 takes control of processor 12 at the most privileged level (e.g., VMXroot on Intel® platforms supporting virtualization, and also known as ring −1 or root mode), and creates a hardware virtualization platform presented as client VM 50 to other software executing on host system 12. Most components of client OS 54, such as OS kernel 55 and a device driver 68, execute at lesser processor privilege than hypervisor 40 (e.g., in ring 0 on Intel platforms, or kernel mode). An exemplary application 58, such as applications 58*a-b* in FIG. 3, execute at lesser processor privilege than client OS 54 (e.g., in ring 3, or user mode).

In some embodiments, parts of VM switch application 60 may execute in user mode, while other parts may execute in kernel mode within client VM 50. In the example of FIG. 5, application 60 includes a trigger event interception module 64 and a sleep transition interception module 66*a*. Trigger event interception module 64 may be configured to intercept an event indicative of a user's request to switch to secure VM 52. Such exemplary events include a user's pressing a combination of keyboard keys, or a user's clicking on a GUI element. In some embodiments, interception of such trigger events is performed by components executing in kernel mode, while components displaying the respective GUI to the user may execute in user mode. In an embodiment implemented on a smartphone, another trigger event may comprise host system 12 receiving a telephone call or some form of electronic message.

Sleep transition interception module 66*a* may be configured to determine whether client OS 52 is performing a transition between a working state and a sleeping state of power management, and to signal the transition to hypervisor 40. Signaling between components executing within and outside client VM 50 may be carried out using any method known in the art of virtualization. For instance, to transmit data from sleep transition interception module 66*a* to hypervisor 40, some embodiments use a privileged processor instruction to transfer control of processor 12 from VM 50 to hypervisor 40. An example of such privileged instructions is VMCALL on Intel platforms. The actual data being transmitted may be placed in a predetermined section of memory shared between module 66*a* and hypervisor 40. In an alternative embodiment, hypervisor 40 installs a sleep transition interception module 66*b*, executing at the same privilege level as hypervisor 40 (e.g., root mode). Module 66*b* may detect a transition of client OS 54 to a sleep state directly from the level of hypervisor 40. More details of such detection are given below.

Figure 6:
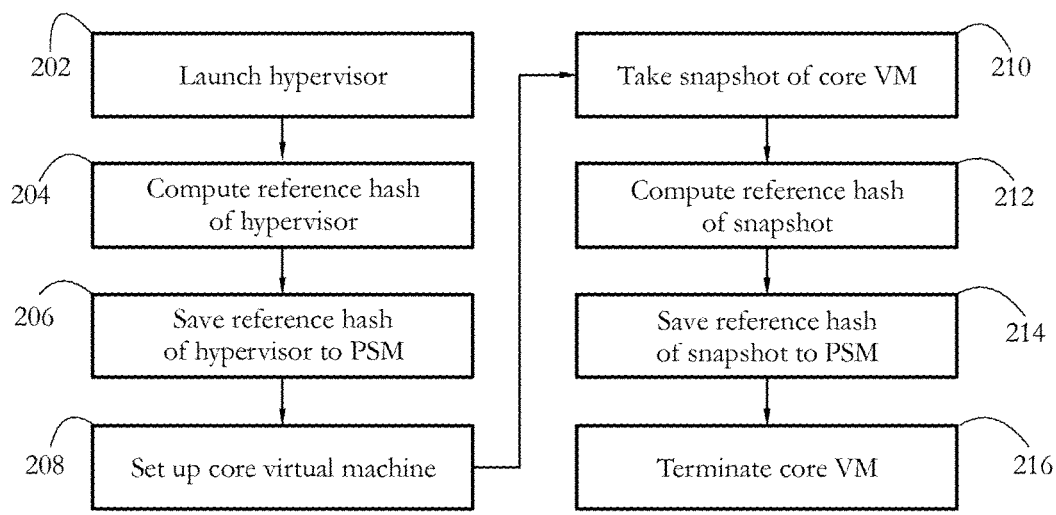
FIG. 6 shows an exemplary set of steps performed by the VM switch application of FIG. 4 during an initialization of the secure VM, according to some embodiments of the present invention.

FIG. 6 shows an exemplary sequence of steps performed by VM switch application 60 and/or hypervisor 40, to set up secure VM 52 according to some embodiments of the present invention. The steps illustrated in FIG. 5 may be carried out, for instance, upon installation of application 60 on host system 12. In one such example, VM switch application 60 may be installed on a host system, which does not already include hypervisor 40, i.e., in a software configuration wherein client OS 54 interfaces directly with processor 22 and memory unit 24, among others. In a step 202, application 60 may launch hypervisor 40. In some embodiments, hypervisor 40 may then take control of processor 22 at highest privilege level, and displace client OS 54 to a lesser privilege level (e.g., kernel mode). In step 202, hypervisor 40 may further create virtual devices of client VM 50, and present such devices to client OS 54 in place of the respective physical devices of host system 12. Such virtual devices may include a virtualized processor, a virtualized memory unit, and virtualizations of some of the components of controller hub 20. In some embodiments, hypervisor 40 does not explicitly virtualize a set of peripheral devices, such as graphic and/or network adapters. Instead, client VM 50 is allowed to access such peripheral devices of host system 12 directly, in a configuration typically called pass-through. Such a configuration is illustrated in FIG. 5, wherein a physical device 25 may represent, for instance, a graphics adapter, accessed directly by client OS 54 via device driver 68. Such configurations may be implemented using any method known in the art of virtualization, for instance employing Intel's VT-d™ technology. In some embodiments, prior to executing step 202, VM switch application 60 may perform a system compatibility check to determine, for instance, whether processor 22 supports virtualization, and/or to determine whether host system 12 has any kind of hardware devices unsupported by hypervisor 40 or secure OS 56.

In a sequence of steps 204-206, VM switch application 60 may perform a set of operations in preparation for a subsequent secure launch of hypervisor 40. In some embodiments, every time hypervisor 40 needs to be launched, its integrity may be checked to ensure that hypervisor 40 has not been tampered with, for instance by malware infecting host system 12. Several methods of integrity checking are known in the art. For instance, a step 204 may compute a hash of a memory image of hypervisor 40 (herein termed reference hash of hypervisor 40) and a step 206 may save the reference hash to the writable memory of protected storage module 30. In some embodiments, the reference hash of hypervisor 40 is pre-computed and delivered to host system 12 as part of an installation package of VM switch application 60. In such cases, step 204 may be skipped.

Figure 7:
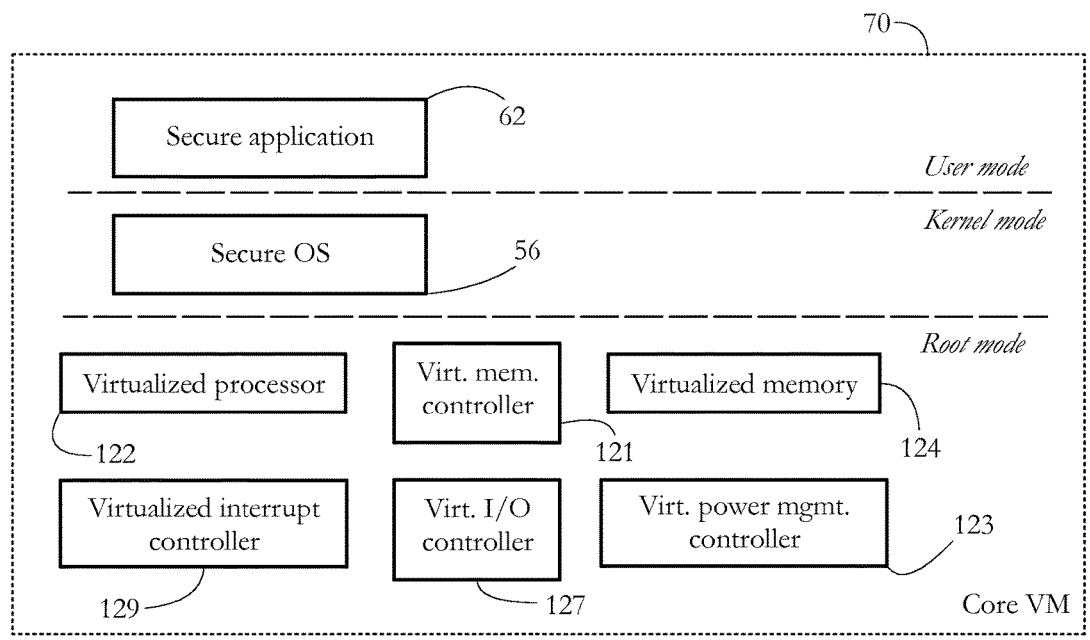
FIG. 7 shows an exemplary configuration of a core virtual machine according to some embodiments of the present invention.

Next, in a step 208, hypervisor 40 may set up a core virtual machine. In some embodiments, the core VM comprises a stripped-down version of secure VM 52, having only a minimal subset of virtualized physical devices. An exemplary core VM 70 is shown in FIG. 7, and comprises a virtualized processor 122, a virtualized memory unit 124, a virtualized memory controller 121, a virtualized interrupt controller 129, a virtualized I/O controller 127, and a virtualized power management controller 123. In an embodiment implemented on a ARM-compatible mobile device, core VM 70 may include, among others, a virtualized processor, a virtualized MMU, a virtualized interrupt controller, and a virtualized System MMU.

Core VM 70 further comprises an instance of secure OS 56, and an instance of secure application 62, among others. In some embodiments, such configurations are achieved by initializing (booting) secure OS 56 within the virtual environment of core VM 70, while hiding from secure OS 56 a set of peripheral devices, such as input, output, storage, and/or network adapters of host system 12. Hiding a peripheral device from secure OS 56 may comprise transmitting a virtualized signal to OS 56, the virtualized signal configured by hypervisor 40 to indicate to OS 56 that the respective peripheral device does not exist. A typical OS boot-up includes a scan of the PCI buses of the host system for information about installed peripheral devices. Such information may be stored as entries in the PCI configuration space of the respective bus. Entries may include a vendor ID and a device ID, among others. When no physical device is connected to the respective PCI bus, the respective configuration entries may hold certain default values, such as 0xFFFF. In some embodiments, to hide a peripheral device from OS 56, hypervisor 40 may intercept an attempt by OS 56 to read/access a content of the PCI configuration space of a virtualized PCI bus of core VM 70, and may expose a default value to OS 56. In the current example, the respective virtualized PC bus may be a part of virtualized I/O controller 127, and may represent a virtualization of the physical PCI bus connecting the respective peripheral device to processor 22 and/or memory unit 24. Alternatively, when OS 56 attempts to access a PCI configuration space through I/O ports (e.g. 0xCF8, 0xCFC), hypervisor 40 may intercept the access attempt using an I/O port virtualization bitmap, configured for core VM 70 according to Intel VT-x specifications, for example. Similar techniques may be used to hide non-PCI devices.

Figure 8:
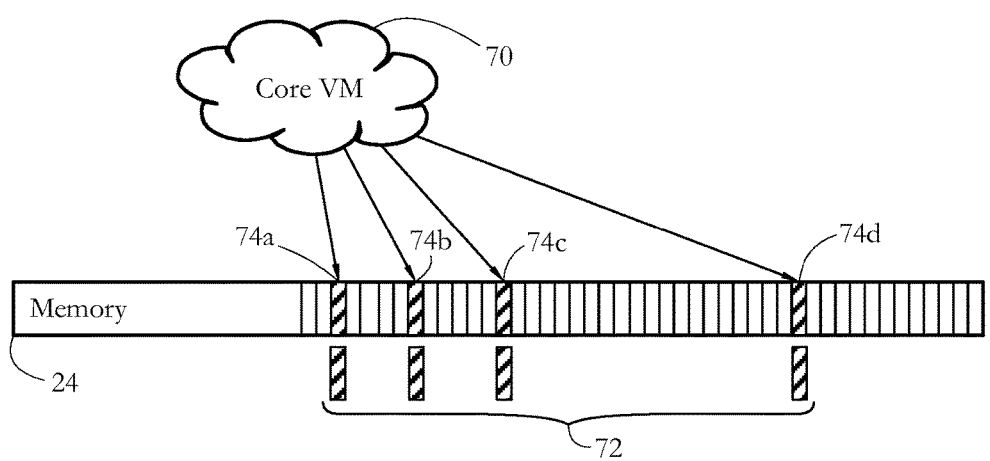
FIG. 8 illustrates a snapshot of a core VM, according to some embodiments of the present invention.

In a step 210 (FIG. 5), hypervisor 40 and/or VM switch application 60 take a snapshot of core VM 70, herein called core VM snapshot. Step 210 further comprises storing the core VM snapshot on a storage device of host system 12, for instance on a hard disk. In some embodiments, a snapshot of a VM comprises an image of the current state of a memory space of the respective VM. The snapshot may comprise, for instance, a content of a set of memory pages indicative of the current state of the respective VM, of the operating system and of applications currently in execution within the respective VM. In some embodiments, loading such a snapshot into memory effectively prepares the respective VM to resume execution from the state the respective VM was in at the moment the snapshot was recorded. FIG. 8 shows an exemplary core VM snapshot 72 comprising the contents of a set of memory pages 74a-d hosting data indicating the current state of VM 70. In some embodiments, snapshot 72 includes, among others, an identification indicator of core VM 70, contents of virtualized memory 124, contents of processor registers of virtualized processor 122, and contents of registers of virtualized interrupt controller 129.

In some embodiments, processor 22 is configured to store and access data describing virtual machines to/from a virtual machine configuration area (VMCA) of memory. The VMCA may comprise a dedicated region within the memory space of hypervisor 40, storing data used to describe each VM executing on host system 12, and/or the respective VM's CPU state. In embodiments using Intel VT®-enabled processors, the VMCA is named Virtual Machine Control Structure (VMCS), while in embodiments using AMD-V®-enabled processors, it is known as a Virtual Machine Control Block (VMCB). In some embodiments, core VM snapshot 72 may further comprise a content of the VMCA of each virtualized processor of core VM 70.

A sequence of steps 212-214 (FIG. 5) determine a signature of core VM 70, which can be subsequently used to check the integrity of snapshot 72, in preparation for launching secure VM 52. In some embodiments, a reference hash of core VM snapshot 72 is computed and saved into the writable memory of protected storage module 30. Then, in a step 216, hypervisor 40 may terminate core VM 70. In some embodiments, terminating core VM 70 further comprises pre-allocating a section of memory for an instance of secure VM 52.

Instead of executing steps 208-216, some embodiments may retrieve a prefabricated core VM snapshot, complete with reference hash, from computer-readable media provided, for instance, as an installation package by manufacturers of VM switch application 60. The prefabricated snapshot may then be saved to storage devices 32, while the reference hash may be stored by hypervisor 40 in protected storage module 30. In some embodiments, a plurality of such pre-fabricated snapshots may be made available to host system 12, each snapshot prepared for a particular hardware configuration (e.g., processor manufacturer and/or version), for a particular type of host system (e.g., computer vs. smartphone), or for a particular type of operating system (e.g., Windows® vs. iOS®). In some embodiments, to increase portability of such pre-fabricated snapshots, the snapshots and/or hypervisor 40 may be configured using any method known in the art of virtualization to allow the snapshots to execute on a variety of processor models. For instance, some embodiments may virtualize a processor instruction configured to determine a set of instructions supported by the respective processor. One such exemplary instruction is CPUID on Intel® platforms. Other embodiments may alter the execution of such instructions using, for instance, a dedicated technology such as Intel FlexMigration®.

Figure 9:
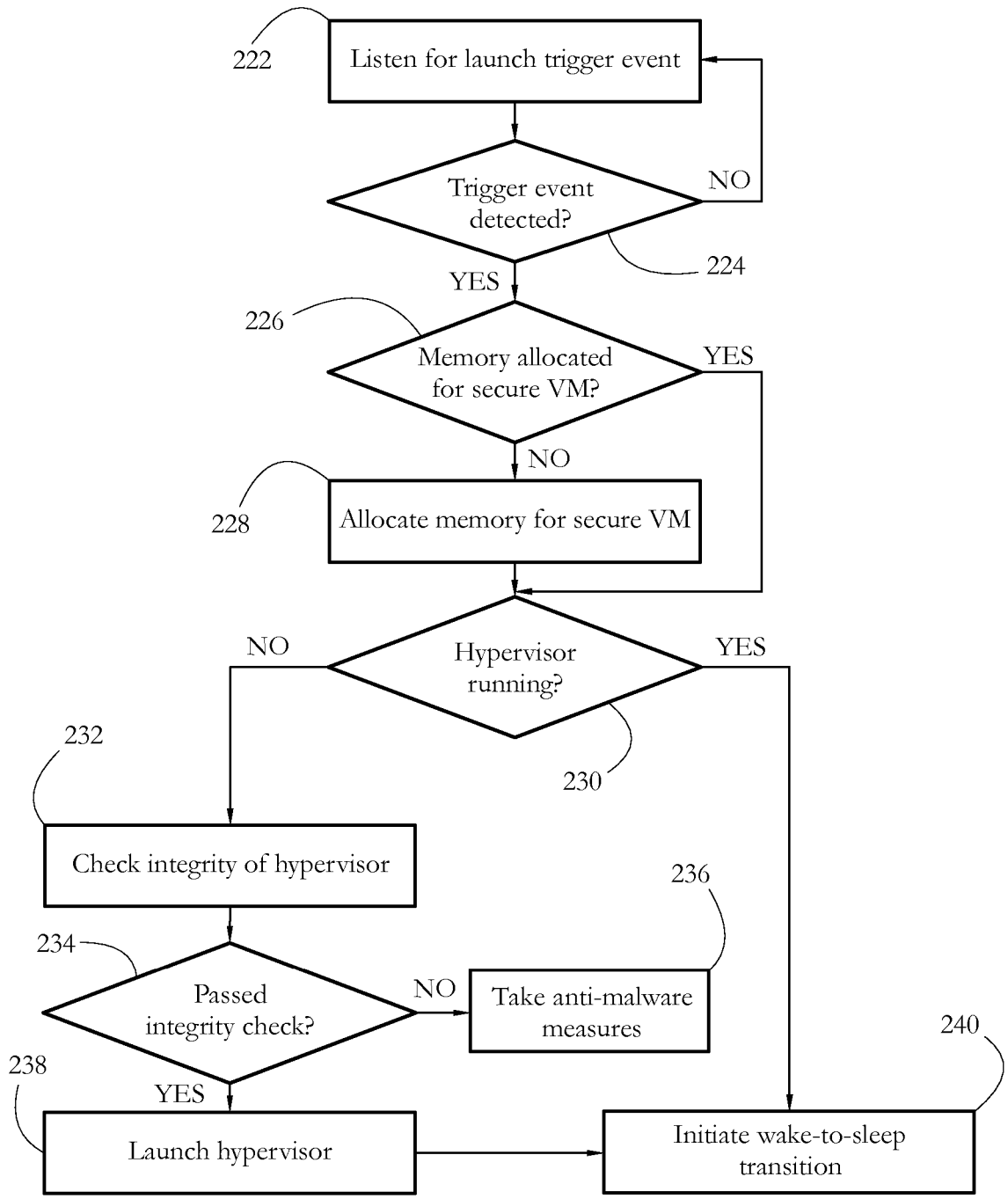
FIG. 9 shows an exemplary sequence of steps performed by the VM switch application to switch execution from the client VM to the secure VM according to some embodiments of the present invention.

FIG. 9 shows an exemplary sequence of steps performed by VM switch application 60 to launch secure VM 52 according to some embodiments of the present invention. A sequence of steps 222-224 waits for the occurrence of a launch trigger event. In some embodiments, the launch trigger event comprises an event likely to expose a user of host system 12 to a data security risk. Data security risk may include, for instance, a risk of exposing private or sensitive information, such as personal identification, username, passwords, bank account or credit card data, in an online Internet transaction. Other examples may include a risk of revealing private or confidential information over an unencrypted voice or data communication channel.

In one exemplary scenario, a user may wish to perform a secure data exchange with a remote computer system, for instance, an online banking or an e-commerce transaction. To communicate with the remote computer system, the user may need to launch a dedicated application, such as a secure banking application, executing within secure VM 52. In such cases, a launch trigger event intercepted by VM switch application 60 may include the user pressing a combination of keyboard keys, or clicking on a GUI element to launch the respective application.

In another exemplary scenario, a user may manage multiple user profiles on host system 12, for instance a personal profile and a corporate profile. In some embodiments, applications of the personal profile may execute within client VM 50, while applications of the corporate profile may execute within secure VM 52. Such a configuration may enable the user, for instance, to carry out secure telephone calls and/or electronic messaging (email, SMS) from the working environment of secure VM 52, wherein such communications may be encrypted. An exemplary launch trigger event for such embodiments may include the host system receiving a telephone call, or an electronic message. Thus, in response to receiving the call or message, execution will be switched over to secure VM 52.

When the trigger event is detected, in a step 226, application 60 determines whether memory is already allocated for an instance of secure VM 52, and when yes, application 60 advances to a step 230 described below. When no memory has been pre-allocated for secure VM 52, in a step 228, VM switch application 60 may instruct client OS 54 to allocate a section of memory for secure VM 52. In some embodiments, hypervisor 40 may determine addresses of memory pages allocated by client OS 54 to secure VM 52 using a page table mechanism (for instance, extended page tables-EPT on Intel platforms). In an alternative embodiment, in step 228, hypervisor 40 may itself allocate the section of memory for secure VM 52, instead of instructing OS 54 to do so.

In some embodiments, a step 230 determines whether hypervisor 40 is currently executing, and when yes, application 60 proceeds to a step 236 described below. When hypervisor 40 is not running, in a sequence of steps 232-238, VM switch application 60 may carry out a secure launch of hypervisor 40. In some embodiments, the secure launch of hypervisor 40 may be performed using a dedicated third-party technology such as Intel Trusted Execution Technology (TXT)®, or ARM TrustZone®, among others. Some of these methods load a software component known as a measured load environment (MLE), which then carries out the attestation of other components, such as hypervisor 40 and/or core VM 70 (more details below).

In one exemplary embodiment, a step 232 checks the integrity of hypervisor 40, for instance by loading hypervisor 40 into memory, computing a hash of a memory image of hypervisor 40, and comparing the hash to the reference hash of hypervisor 40 stored in protected storage module 30 (see above, in relation to steps 204-206 in FIG. 6). A hash match may indicate that the image loaded in memory is identical to the original image loaded at installation, thus confirming the integrity of hypervisor 40. A hash mismatch typically indicates that hypervisor 40 has been tampered with, usually by malware. When integrity is confirmed, a step 238 may launch hypervisor 40 into execution. When hypervisor 40 does not pass the integrity check, for instance if the hash computed in step 232 does not match the reference hash of hypervisor 40 stored in protected storage module 30, hypervisor 40. A step 236 may take anti-malware measures, such as alerting a user of host system 12 and/or blocking or otherwise restricting the execution of VM switch application 60.

In a step 240, application 60 may instruct client OS 54 to perform a wake-to-sleep transition. In some embodiments, the wake-to-sleep transition translates client VM 50 from a state with relatively high power consumption to a state with relatively low power consumption, by selectively powering down a subset of hardware devices. Operating systems typically manage power consumption via a power management interface configured according to the Advanced Power Management (APM) and/or Advanced Configuration and Power Interface (ACPI) specifications. Among other, the ACPI specification differentiates between a working state of a computer system and a sleeping state of the computer system, the sleeping state having several possible sub-states according to which hardware devices are powered, and which are turned off. The working state is commonly known in the art as S0, and is a state in which all hardware devices used by the computer system are fully operational (powered). Sleeping states are usually labeled S1 through S4, with S3 commonly known as standby or suspend-to-RAM, and S4 commonly known as hibernation or suspend-to-disk. In some embodiments, the S3 state (standby) is characterized by the fact that random access memory (RAM) devices remain powered, and therefore the content of volatile memory units is preserved, while peripheral devices are in a low-powered condition or turned off (e.g., ACPI device state D3). In a typical S4 state (hibernation), the content of volatile memory is saved to a non-volatile storage device, and RAM is powered down together with peripheral devices. In some embodiments, the wake-to-sleep transition comprises a transition from an S0 (working) state to an S3 (standby) state.

Figure 10:
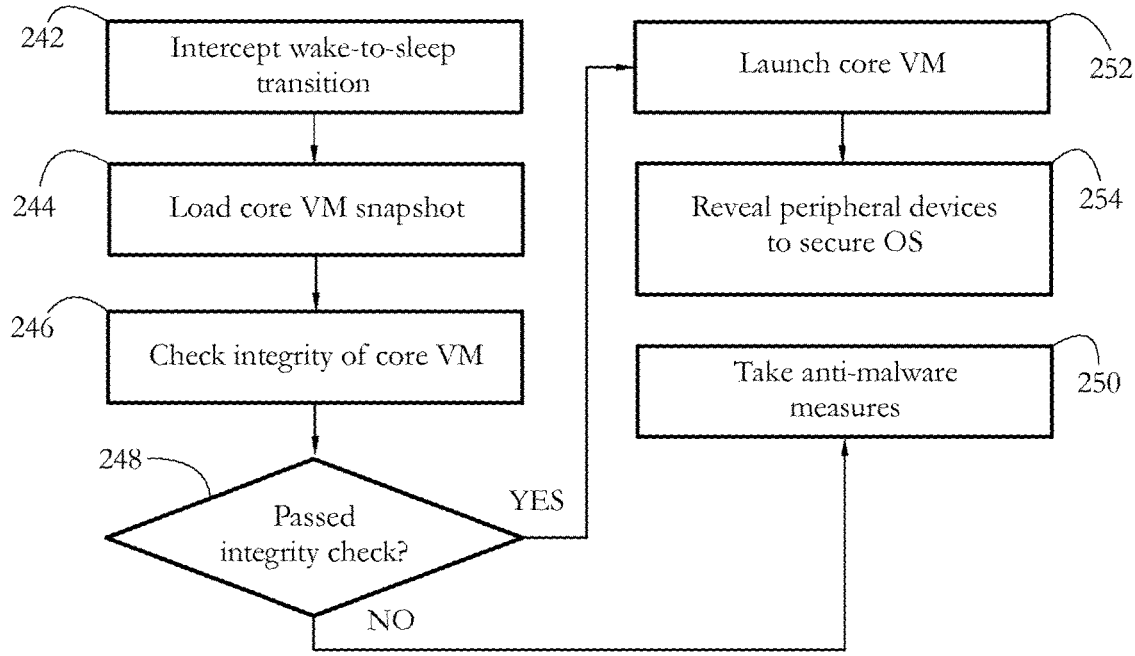
FIG. 10 shows an exemplary sequence of steps performed by the hypervisor in FIG. 4 to switch execution from the client VM to the secure VM according to some embodiments of the present invention.

FIG. 10 shows an exemplary sequence of steps performed by hypervisor 40 to switch execution to secure VM 52 according to some embodiments of the present invention. In a step 242, hypervisor 40 intercepts an event indicative of the wake-to-sleep transition initiated by VM switch application 60 in step 240. Wake-to-sleep transitions typically comprise a sequence of steps, such as disabling device drivers, saving a state of the respective devices to memory and/or disk, and instructing firmware, such as the Basic Input/Output System (BIOS) of host system 12, to actually power down the respective devices. In some embodiments, step 242 comprises employing hypervisor 40 to detect the execution of at least one of these steps. For instance, hypervisor 40 may detect an attempt by client OS 54 to write a particular value to a register of the power management interface, the value indicating to the BIOS to power down a hardware device. Since OS 54 executes within a virtualized environment, intercepting the attempt to write to the register of the power management interface may amount to intercepting an attempt by OS 54 to write to a memory page allocated by hypervisor 40 to the respective virtual register of the virtual power management interface of client VM 50. In some embodiments, step 242 may include intercepting an attempt by OS 54 to write to an I/O port.

Following a successful interception of the wake-to-sleep transition, hypervisor 40 may switch execution to secure VM 52 in a sequence of steps 244-254. Switching to secure VM 52 comprises, among others, loading core VM snapshot 72 into the section of memory allocated to secure VM 52 by client OS 54 (see, e.g., step 228 in FIG. 9). Loading snapshot 72 enables host system 12 to execute an instance of core VM 70, a stripped-down version of secure VM 52, having only a minimal subset of virtualized devices. Snapshot 72 is pre-determined, i.e., determined at a time preceding the wake-to-sleep transition of client VM 50. In some embodiments, snapshot 72 is pre-determined by application 60 and/or hypervisor 40 during the installation of application 60 (see, e.g., steps 208-210 in FIG. 6). In an alternative embodiment, snapshot 72 is pre-fabricated remotely by the manufacturer of VM switch application 60 and delivered to host system 12, for instance, as part of an installation package for application 60.

In some embodiments, switching to secure VM 52 further comprises, in a step 246, checking the integrity of core VM 70, for instance by computing a hash of the loaded memory image, and comparing the hash to the reference hash of snapshot 72, the reference hash stored on protected storage module 30 (see step 214 in FIG. 6). A hash match may indicate that the image of core VM 70 currently residing in memory is identical to snapshot 72, thus verifying the integrity of core VM 70. When the integrity of core VM 70 is verified (step 248), a step 252 may launch core VM 70 into execution. When the integrity check fails, core VM 70 may be compromised by malware; therefore, step 250 may take anti-malware measures, such as alerting a user and/or blocking execution of application 60 and/or blocking execution of core VM 70.

Since some I/O or peripheral devices (e.g., graphics and network adapters) have been hidden from secure OS 56 during setup of core VM 70, snapshot 72 does not include OS state and device drivers for the respective devices, i.e., core VM 70 is not aware of and cannot access the respective devices. In a step 254, hypervisor 40 may reveal a subset of peripheral devices of host system 12 to secure OS 56, by using any method known in the art of virtualization. For instance, hypervisor 40 may set up a pass-through configuration, wherein OS 56 may directly access the respective device, and send a virtualized signal to OS 56 indicating that a new peripheral device was added to VM 70. OS 56 may subsequently identify the respective device and load a corresponding device driver.

In some embodiments, execution of steps 252-254 transforms core VM 70 into secure VM 52, enabling the user to securely use I/O and peripheral devices, such as a keyboard, a display, and a network adapter of host system 12. The user may now employ secure application 62 to perform a secure data exchange with service providing server 14, for instance to carry out a secure bank transaction, or to securely access an online gaming community.

In some embodiments, the sequence of steps executed by VM switch application 60 and/or hypervisor 40 to switch execution from client VM 50 to secure VM 52 may differ from the one represented in FIGS. 9-10. For instance, in some embodiments, application 60 may signal to hypervisor 40 after completing the launch of hypervisor 40 (step 238 in FIG. 9), or in response to determining that hypervisor 40 is already executing (step 230 in FIG. 9). In response to receiving the signal, hypervisor 40 may initiate the launch of core VM 70 without waiting for the event indicative of the wake-to-sleep transition of client VM 50. One such embodiment may load core VM snapshot 72 (step 244), and then wait for the occurrence of the event indicative of the wake-to-sleep transition of client VM 50 to launch core VM 70 into execution (step 252).

Figure 11:
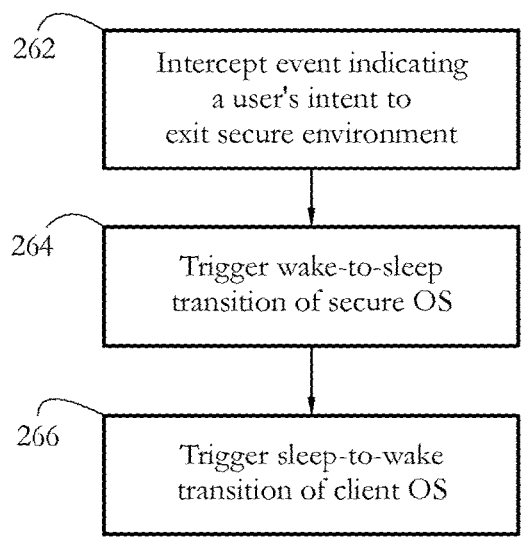
FIG. 11 shows an exemplary sequence of steps performed by the hypervisor to switch execution from the secure VM to the client VM according to some embodiments of the present invention.

FIG. 11 shows an exemplary sequence of steps performed by hypervisor 40 to switch execution from secure VM 52 to client VM 50 according to some embodiments of the present invention. When the user intends to leave the secure environment of secure VM 52, he/she may signal his/her intention, for instance by pressing a pre-determined combination of keys or by clicking a GUI element. In a step 262, hypervisor 40 may intercept an event indicating the user's intent to exit VM 52, for instance a keyboard event indicating that the user has pressed a combination of keys. Next, in a step 264, hypervisor 40 may induce a wake-to-sleep transition of secure OS 56, the wake-to-sleep transition translating secure VM 52 into a partially powered-down state, such as standby (e.g., ACPI state S3). Alternatively, step 264 may comprise terminating secure VM 52.

When secure VM 52 is just transitioned into a sleeping state, some embodiments may encrypt a content of the memory section allocated to VM 52, or may protect a content of the respective memory section from modification by software executing in client VM 50. To protect such content, some embodiments may enforce an isolation of the respective memory section using, for instance, Intel's EPT and/or VT-d® technology. Some embodiments may employ hypervisor 40 to intercept an attempt by software executing within client VM 50 to write to a memory page allocated to VM 52, and deny or redirect the respective write attempt.

In a step 266, hypervisor 40 may then induce a sleep-to-wake transition of client OS 56, thus restoring the environment of client VM 50. In some embodiments, a user may repeatedly switch back and forth between client VM 50 and secure VM 52 in response to user input, by repeating the sequences of steps in FIGS. 8-9-10.

The exemplary systems and methods described above enable a host system allowing hardware virtualization to expose a secure environment, which can be used to carry out secure communications with a remote service provider, for applications such as online banking, e-commerce, private messaging, and online gaming, among others. In some embodiments, an application installed in an insecure environment launches a hypervisor, which displaces the insecure environment to a client virtual machine, and creates the secure environment in the form of a secure virtual machine. The hypervisor may switch execution between the insecure environment and the secure environment in response to a user input, such as the user's pressing a key combination or clicking on a GUI element. In some embodiments, switching from the insecure to the secure environment comprises transitioning the client VM to a sleeping state of power management, such as standby or hibernation, and loading the secure VM from a memory image stored to disk. Switching from the secure to the insecure environment may comprise transitioning the secure VM into a sleeping state and waking up the client VM.

In conventional computer systems, malware can compromise the safety and privacy of data exchange. Such systems may employ malware scanners to try to ensure that a client system does not comprise malware, before attempting to exchange sensitive information with a remote party. Malware scanners may place a significant burden on the computational resources of a host system, and may reduce overall productivity and increase the cost of operation of the host system. Additionally, the effectiveness of malware scanners may depend essentially on the ability to maintain up-to-date databases of malware-identifying features and/or behaviors, to cope with the ever-changing nature of malware threats. In contrast, some embodiments of the present invention do not require a malware scanner for operation. Instead, communication with remote parties is carried out from a secure environment, configured as a separate, authenticated, trusted virtual machine. The secure VM is launched only when its memory image is found to be identical to a reference, malware-free image (snapshot) previously stored by the hypervisor.

In typical hardware virtualization configurations, a plurality of virtual machines may execute concurrently on one host system, with various degrees of isolation. In such systems, carefully-crafted malware may compromise the security of communication, for instance by intercepting keyboard inputs such as passwords and credit card details. In contrast, in some embodiments of the present invention, the client VM and secure VM may never share the use of peripheral devices, such as a keyboard and a network adapter, among others. By transitioning the insecure environment to a sleeping state, some embodiments ensure that while secure VM is executing, the secure VM has exclusive use of the respective peripheral devices. Therefore, as a user types a password on a keyboard or receives sensitive information on a screen, wherein the keyboard and the screen are controlled by the secure VM, malware loaded into the insecure environment may not intercept such data, as the insecure client VM is in a sleeping state wherein no code is executed and peripheral devices are switched off.

Having a configuration wherein either the insecure or the secure VM are in a sleeping state, while the other is executing, allows some embodiments of the present invention to use a minimal, thin layer hypervisor instead of a fully featured one. For instance, the hypervisor may be configured to virtualize only a relatively small subset of physical devices, such as the processor, memory, and some controller devices. Instead of virtualizing I/O and/or peripheral devices, such as a graphic adapter, keyboard, and/or network adapter, some embodiments allow the virtual machines executing on the host system to access such devices directly, without the virtualization layer present in typical virtualization applications. Such configurations may carry substantially lower performance penalties, compared to fully-virtualized configurations, and may contribute to a more pleasant user experience, especially on mobile platforms such as smartphones and tablet computers.

In conventional power management applications, transitioning a computer system back and forth between a working state and a sleeping state typically carries a substantial computational burden and time penalty, since the content of volatile memory (RAM) may need to be transferred repeatedly between the memory unit and a non-volatile computer-readable medium such as a hard disk. In contrast, in some embodiments of the present invention, switching to the secure environment does not include transferring the contents of memory to the disk. Instead, a section of memory is allocated from within the insecure environment for the secure VM, and the secure VM is loaded into the respective section of memory upon switching environments.

In some embodiments, the snapshot used to launch the secure VM upon switching environments comprises only a minimal, core virtual machine having few, if any, virtualized peripheral devices. To construct such a snapshot, some embodiments of the present invention may perform a controlled boot-up of the secure VM, while hiding a set of peripheral devices from an operating system executing within the secure VM. Such configurations may speed up subsequent launches of the secure VM. Once the snapshot is loaded, peripheral devices are exposed, triggering the dynamic loading of device drivers for the exposed devices.

Such configurations may also increase the portability of some embodiments of the present invention, since the same snapshot may be used to launch the secure VM on multiple host systems having diverse configurations of peripheral devices. Furthermore, using a snapshot of a core VM may efficiently address hardware upgrade issues. Since the snapshot of the core VM does not include representations of some peripheral devices, a change/upgrade of the respective devices may not require changing the snapshot.

It will be clear to one skilled in the art that the above embodiments may be altered in many ways without departing from the scope of the invention. Accordingly, the scope of the invention should be determined by the following claims and their legal equivalents.

What is claimed is:

1. A host system comprising at least one processor configured to execute a hypervisor, the hypervisor configured to expose a client virtual machine (VM) and a secure VM, the client VM and secure VM executing alternately on the host system, wherein:
   the client VM is configured to execute a VM switch application, the VM switch application configured, in response to detecting a trigger event indicative of a risk to a user's data security, to instruct an operating system of the client VM to perform a wake-to-sleep transition, the wake-to-sleep transition configured to transform the client VM from a state in which a peripheral device used by the client VM is in a high-powered condition to a state in which the peripheral device is in a low-powered condition; and
   the hypervisor is further configured to switch execution to the secure VM, wherein switching execution to the secure VM comprises:
      loading a pre-determined core VM snapshot into memory, the core VM snapshot being determined by initializing an operating system of the secure VM while hiding the peripheral device from the operating system of the secure VM;
      in response to intercepting an event indicative of the wake-to-sleep transition, executing the core VM snapshot to launch the secure VM; and
      in response to launching the secure VM, revealing the peripheral device to the operating system of the secure VM.

2. The host system of claim 1, wherein switching execution to the secure VM further comprises, in response to loading the core VM snapshot, checking the integrity of the core VM snapshot.

3. The host system of claim 1, wherein loading the core VM snapshot is performed in response to intercepting the event indicative of the wake-to-sleep transition.

4. The host system of claim 1, wherein the secure VM is configured to perform an electronic communication with a remote computer system, and wherein the trigger event comprises receiving a user input indicative of the user's intent to perform the electronic communication.

5. The host system of claim 1, wherein the trigger event comprises the host system receiving an electronic communication from a remote computer system.

6. The host system of claim 1, wherein the host system comprises a telephone, and wherein the trigger event comprises the host system receiving a telephone call.

7. The host system of claim 1, wherein the peripheral device comprises an item selected from a group consisting of a keyboard, a display adapter, and a network adapter.

8. The host system of claim 1, wherein hiding the peripheral device comprises intercepting an attempt by the operating system of the secure VM to access a configuration space of a peripheral component interconnect (PCI) bus connecting the peripheral device to the at least one processor.

9. The host system of claim 1, wherein intercepting the event indicative of the wake-to-sleep transition comprises intercepting an attempt by the operating system of the client VM to access a register of a power management controller of the host system.

10. The host system of claim 1, wherein the hypervisor is further configured, in response to detecting an event indicating a user's intent to exit the secure VM, to instruct the operating system of the client VM to perform a sleep-to-wake transition, wherein the sleep-to-wake transition transforms the client VM from the state in which the peripheral device is in the low-powered condition to the state in which the peripheral device is in the high-powered condition.

11. A non-transitory computer-readable medium storing instructions which, when executed by at least one processor of a host system, configure the at least one processor to form a hypervisor configured to expose a client virtual machine (VM) and a secure VM, the client VM and secure VM executing alternately on the host system, wherein:
the client VM is configured to execute a VM switch application, the VM switch application configured, in response to detecting a trigger event indicative of a risk to a user's data security, to instruct an operating system of the client VM to perform a wake-to-sleep transition, the wake-to-sleep transition configured to transform the client VM from a state in which a peripheral device used by the client VM is in a high-powered condition to a state in which the peripheral device is in a low-powered condition; and
the hypervisor is further configured to switch execution to the secure VM, wherein switching execution to the secure VM comprises:
loading a pre-determined core VM snapshot into memory, the core VM snapshot being determined by initializing an operating system of the secure VM while hiding the peripheral device from the operating system of the secure VM;
in response to intercepting an event indicative of the wake-to-sleep transition, executing the core VM snapshot to launch the secure VM; and
in response to launching the secure VM, revealing the peripheral device to the operating system of the secure VM.

12. The computer-readable medium of claim 11, wherein switching execution to the secure VM further comprises, in response to loading the core VM snapshot, checking the integrity of the core VM snapshot.

13. The computer-readable medium of claim 11, wherein loading the core VM snapshot is performed in response to intercepting the event indicative of the wake-to-sleep transition.

14. The computer-readable medium of claim 11, wherein the secure VM is configured to perform an electronic communication with a remote computer system, and wherein the trigger event comprises receiving a user input indicative of the user's intent to perform the electronic communication.

15. The computer-readable medium of claim 11, wherein the trigger event comprises the host system receiving an electronic communication from a remote computer system.

16. The computer-readable medium of claim 11, wherein the host system comprises a telephone, and wherein the trigger event comprises the host system receiving a telephone call.

17. The computer-readable medium of claim 11, wherein the peripheral device comprises an item selected from a group consisting of a keyboard, a display adapter, and a network adapter.

18. The computer-readable medium of claim 11, wherein hiding the peripheral device comprises intercepting an attempt by the operating system of the secure VM to access a configuration space of a peripheral component interconnect (PCI) bus connecting the peripheral device to the at least one processor.

19. The computer-readable medium of claim 11, wherein intercepting the event indicative of the wake-to-sleep transition comprises intercepting an attempt by the operating system of the client VM to access a register of a power management controller of the host system.

20. The computer-readable medium of claim 11, wherein the hypervisor is further configured, in response to detecting an event indicating a user's intent to exit the secure VM, to instruct the operating system of the client VM to perform a sleep-to-wake transition, wherein the sleep-to-wake transition transforms the client VM from the state in which the peripheral device is in the low-powered condition to the state in which the peripheral device is in the high-powered condition.

21. A non-transitory computer-readable medium storing instructions which, when executed by at least one processor of a host system, configure the at least one processor to form a hypervisor configured to expose a client virtual machine (VM) and a secure VM, the client VM and secure VM executing alternately on the host system, wherein:
the client VM is configured to execute a VM switch application, the VM switch application configured, in response to detecting a trigger event indicative of a risk to a user's data security, to instruct an operating system of the client VM to perform a wake-to-sleep transition, the wake-to-sleep transition configured to transform the client VM from a state in which a peripheral device used by the client VM is in a high-powered condition to a state in which the peripheral device is in a low-powered condition; and
the hypervisor is further configured to switch execution to the secure VM, wherein switching execution to the secure VM comprises:
loading a pre-determined core VM snapshot into memory, the core VM snapshot being determined by initializing an instance of the operating system of the secure VM on a second computer system distinct from the host system, while the peripheral device is not present;
in response to intercepting an event indicative of the wake-to-sleep transition, executing the core VM snapshot to launch the secure VM; and
in response to launching the secure VM, revealing the peripheral device to the operating system of the secure VM.

22. The computer-readable medium of claim 21, wherein the secure VM is configured to perform an electronic communication with a remote computer system, and wherein the trigger event comprises receiving a user input indicative of the user's intent to perform the electronic communication.

23. The computer-readable medium of claim 21, wherein the trigger event comprises the host system receiving an electronic communication from a remote computer system.

24. The computer-readable medium of claim 21, wherein the host system comprises a telephone, and wherein the trigger event comprises the host system receiving a telephone call.

25. The computer-readable medium of claim 21, wherein the peripheral device comprises an item selected from a group consisting of a keyboard, a display adapter, and a network adapter.

26. The host system of claim 1, wherein the core VM snapshot comprises a memory image of a security application configured to communicate with a remote computer system, and wherein executing the core VM snapshot comprises executing at least a part of the security application.

27. The computer-readable medium of claim 21, wherein the core VM snapshot comprises a memory image of a security application configured to communicate with a remote computer system, and wherein executing the core VM snapshot comprises executing at least a part of the security application.

\* \* \* \* \*